4 Sheets—Sheet 4.
H. W. ADAMS.
Air-Blast Kilns for Burning Bricks, Tiles, Lime, &c
No. 196,105. Patented Oct. 16. 1877.
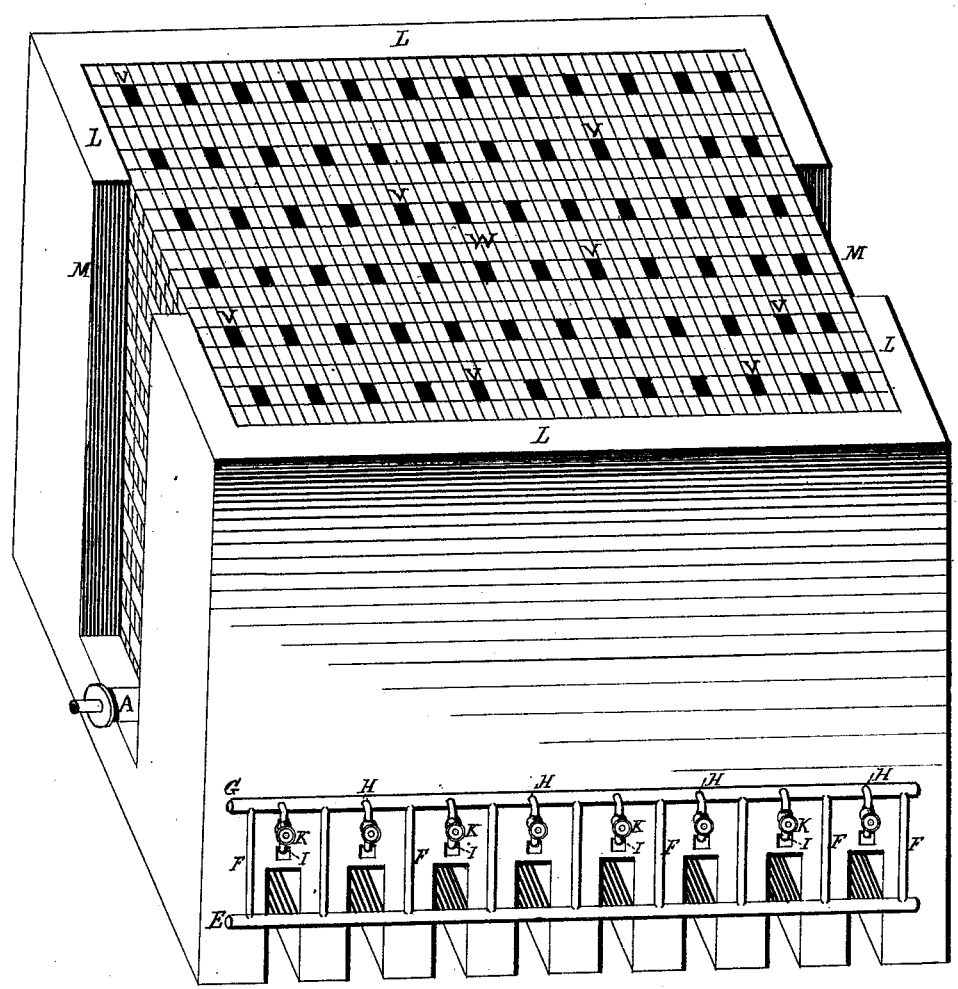
Witnesses.
Isaac Ro. Oakford.
Inventor.
Henry W. Adams

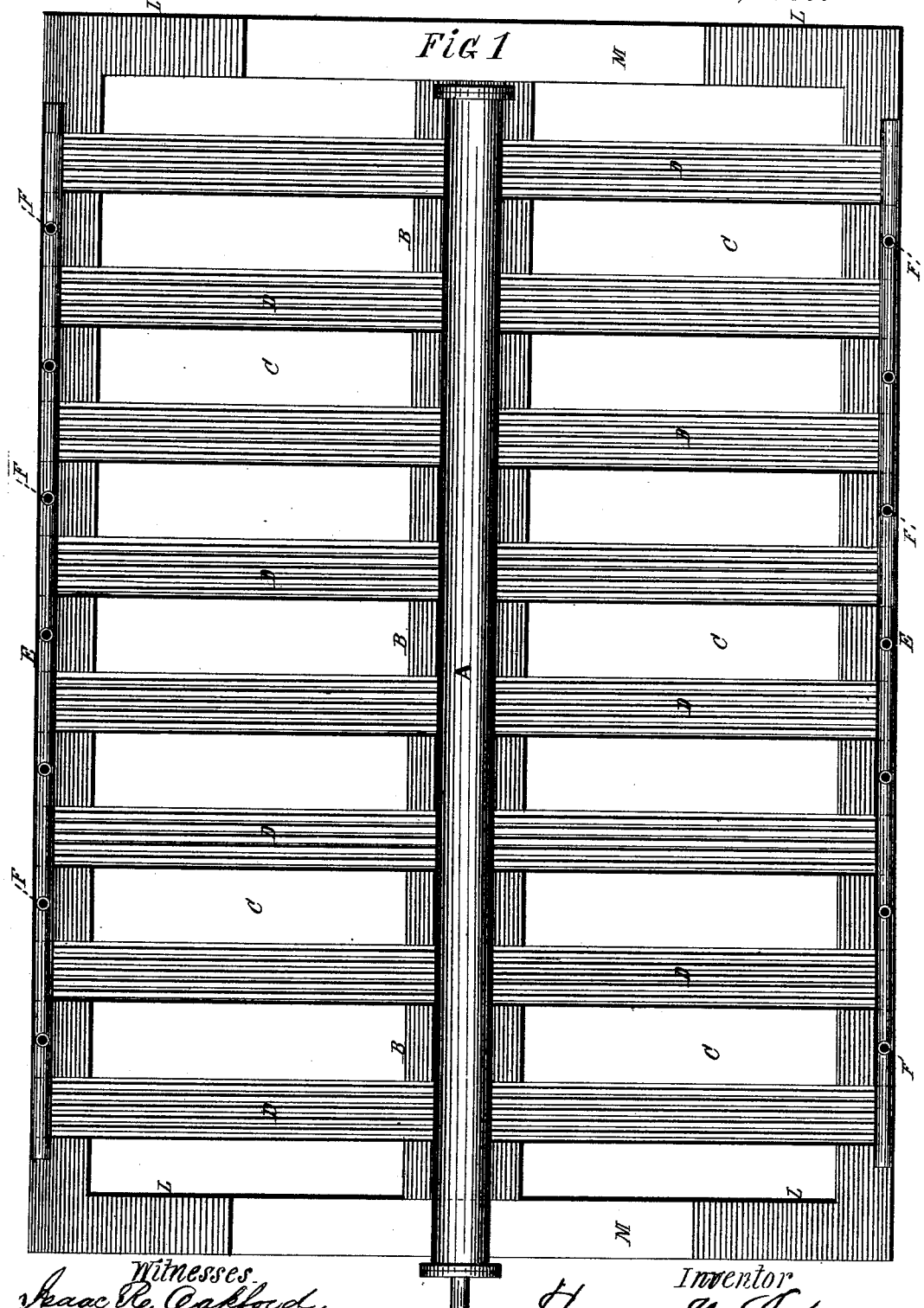

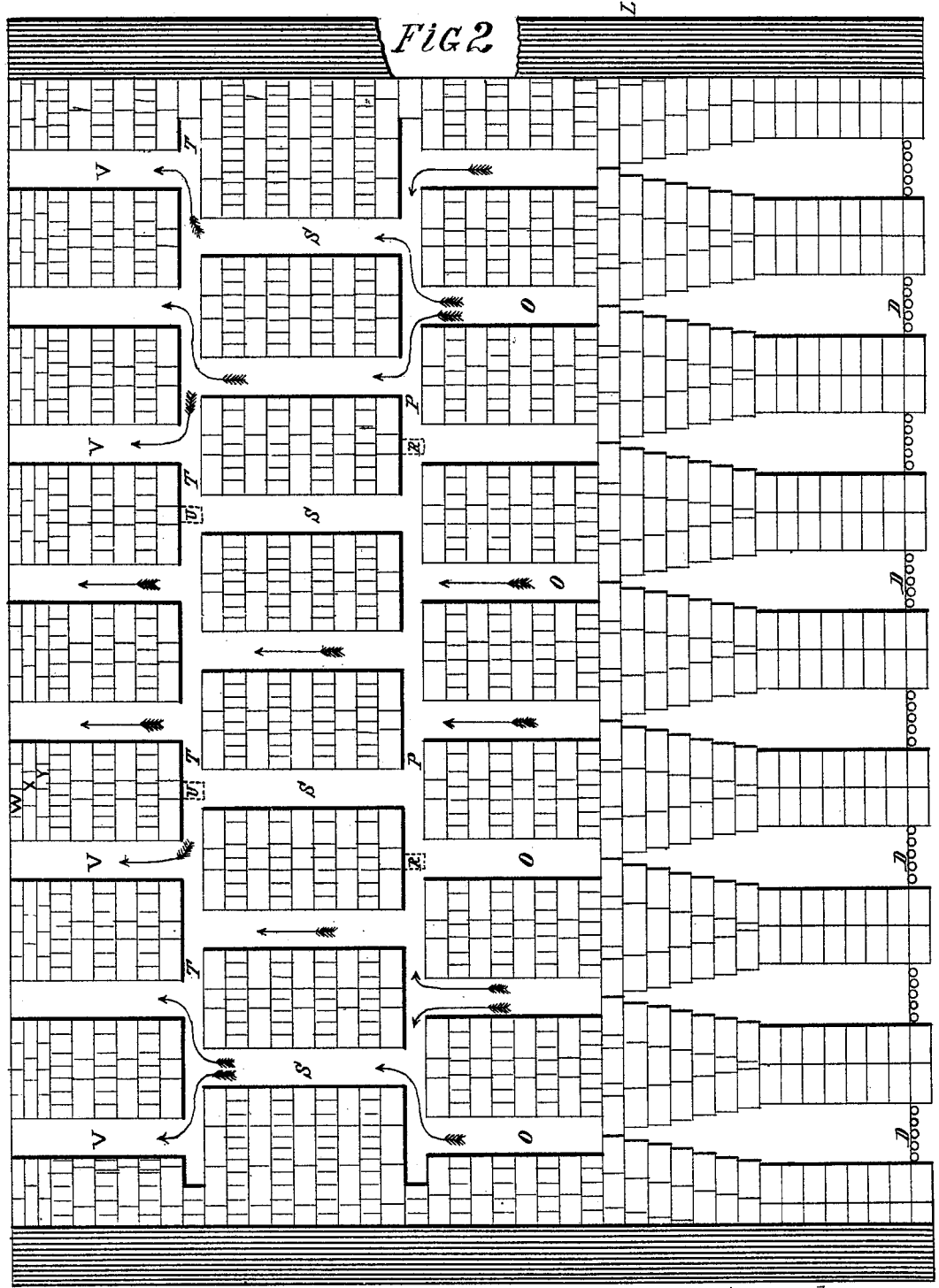

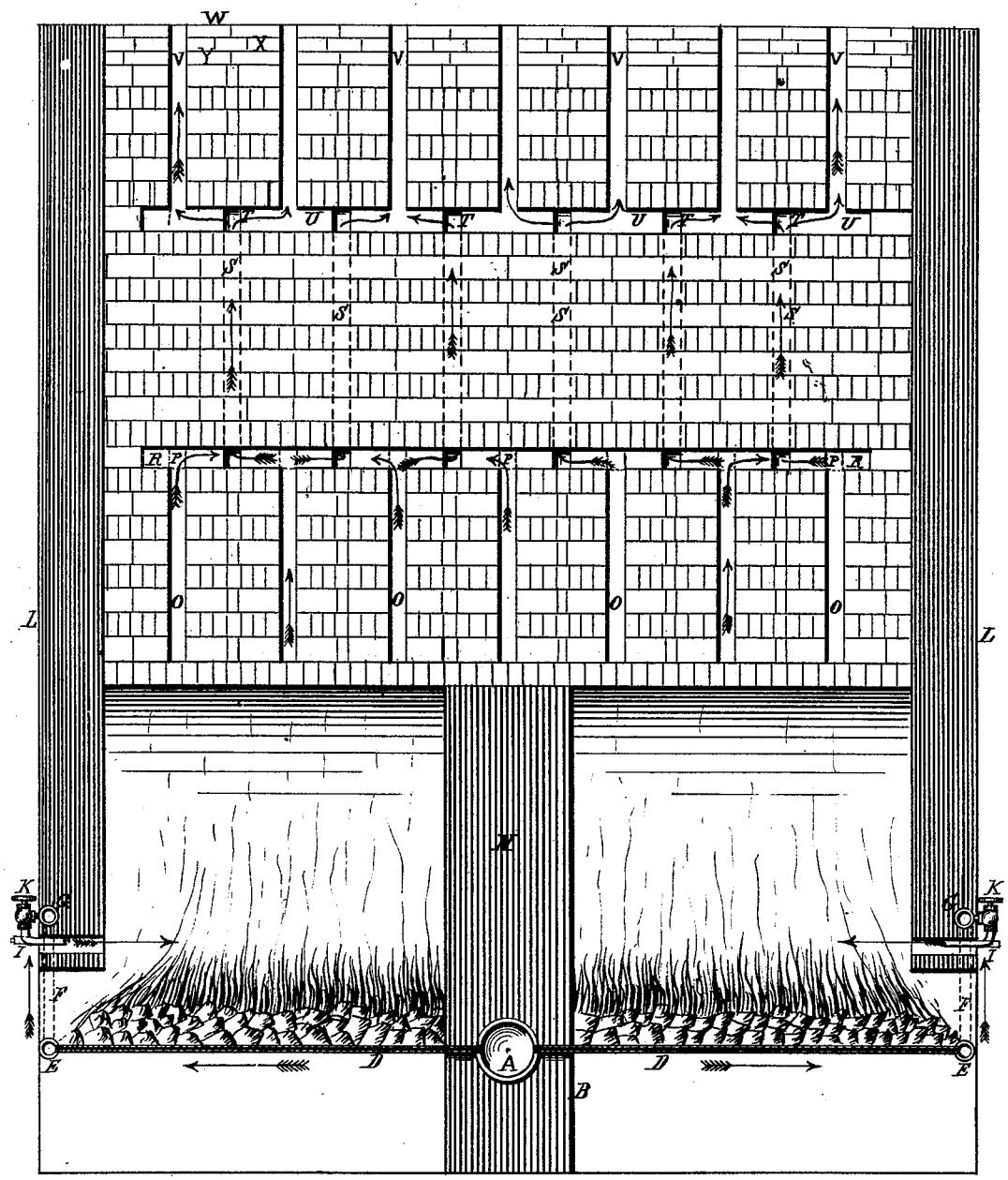

UNITED STATES PATENT OFFICE.

HENRY W. ADAMS, OF PHILADELPHIA, PA., ASSIGNOR OF ONE-HALF HIS RIGHT TO JOHN QUINCY ADAMS ZIEGLER, OF SAME PLACE.

IMPROVEMENT IN AIR-BLAST KILNS FOR BURNING BRICKS, TILES, LIME, &c.

Specification forming part of Letters Patent No. 196,105, dated October 16, 1877; application filed July 23, 1877.

*To all whom it may concern:*

Be it known that I, HENRY W. ADAMS, of the city and county of Philadelphia and State of Pennsylvania, have invented an improvement in kilns for burning bricks, tiles, pipes, pottery-ware, earthenware, stoneware, lime, bones, ores, and other similar substances requiring thorough burning, of which the following is a specification:

The object of my invention is the construction of an improved kiln for burning the aforesaid substances, and drying the same, preparatory thereto, in a quicker, cheaper, and a more uniform manner than has heretofore been done, so far as is known to me.

The said kiln is illustrated more in detail in the plan view of the floor or bottom part of the same, as shown in Figure 1, and in the vertical section, Fig. 2, and in the transverse vertical section, Fig. 3, and in the perspective view, Fig. 4.

In carrying out my invention, I prefer to build a kiln having an inside measurement of forty feet in length and thirty feet in width. Such a kiln should have twelve ash-pits, and twelve sets of grate-bars above them, on each of its opposite sides. This will be a twelve-arched kiln, and will hold two hundred thousand bricks when set thirty-six courses high. The ash-pits should be thirteen inches wide and two feet deep below the grate-bars. The distance between the inside of the inclosing-wall and the first ash-pit will be one foot. The solid spaces between the respective ash-pits will be about two feet and three inches wide. The distance between the respective arches of the said kiln and between the respective furnace-doors will be, from center to center, about three feet and four inches. In the center of the floor of the kiln, and transversely across the ash-pits, is built a solid wall two feet wide, and as high as the solid spaces between them. Into all these ash-pits I put cast-iron pans half an inch thick and about nine inches deep, to hold water to be boiled by the deflected heat above them to cool the said grate-bars and prevent the formation of clinkers upon them. These pans may be cast in sections about four feet long, and secured together by flanges, bolts, and nuts. They extend the whole length of the ash-pits, and the water is supplied to them at their front ends. The ashes which fall down into them may be hoed out from time to time with a long-handled hoe.

The following letters indicate the respective parts of my invention.

In the ground-plan view shown in Fig. 1, A represents the central air-pipe, into which air, under pressure, is forcibly driven by a blower, fan, force-pump, or any other known machinery for driving a forcible current of air. The pipe leading from this mechanism may be attached to one end of the pipe A, the other end of the said pipe being closed; or the end of the pipe leading from the air-blast machinery may enter the open end of the pipe A, leaving a small annular space around it for the purpose of making an injector and forcing into it an additional volume of air. In a twelve-arched kiln this pipe should be forty-four feet long and one foot in internal diameter. It should be cast in four sections, each eleven feet long, and secured together by flanges, bolts, and nuts. This pipe should be sunk down, so that its under side is twenty inches from the bottom of the ash-pits. The brick wall B inclosing the pipe A should be carried up at least six inches above its top to protect it from the heat of the kiln when burning.

The partition-walls C, between the grate-bars D and the respective ash-pits, should be built up to the same height, so that the floor of the kiln may be level. This will cause the respective grate-bars to be about one foot below the top of the floor of the kiln, and about two feet above the bottom of the ash-pits. The ash-pit walls will be about three feet high, and will produce recesses about one foot deep between them and above the grate-bars to hold the burning fuel. When carts are driven into or through the kiln, a plank floor must be first laid down on the top of the kiln-floor. The grate-bars D are wrought-iron tubes or ordinary gas-pipes. Each furnace contains five. They are one inch and a half in internal diameter, and extend from the pipe A to the pipe E, and rest upon cast-iron bearing-bars about six feet apart, having their respective ends bricked into the ash-pit walls. The grate-bars are parallel with each other, and about three-fourths of an inch apart, so that air may pass between them and rise into the fuel, and promote its combustion.

The horizontal pipe E occupies a position on the two front sides of the kiln, having its center exactly opposite to the center of the pipe A. It should be cast-iron, and fully three inches in internal diameter. It may be cast in sections, and put together by means of flanges, bolts, and nuts. A good method of securing the respective ends of the hollow grates D in the pipes A and E, so as to make tight joints without having to tap out so many holes in these pipes, and to cut threads on the two ends of so many grate-bars, is to cast holes in the pipes A and E to receive the ends of these bars. Their ends will be about one inch and three-quarters in external diameter. The holes in the sides of A and E should, therefore, be as large, and should be funnel-shaped, so as to admit a beveled ring of brass to be driven in tight between the ends of the respective grate-bars D and the perimeters of the said holes. If these brass beveled rings are cast with an open slot, about one-eighth of an inch wide, and slipped onto the ends of the grate-bars loosely, the said bars may be inserted into the holes in A and E, and the brass rings driven in so tight as to close up the slots in the rings, and make a tight and cheap joint between the grates and the said pipes. The sides of the pipes A and E may be cast two inches thick, to give them sufficient strength and thickness to be better adapted to this method of attaching the grate-bars to them. The pipe E has both ends closed, and on its top are cast twelve holes with flanges in which holes for bolts are cast. They are equidistant apart, and are situated, respectively, midway between the furnace-doors. These holes are two and a half inches in diameter. Upright pipes F, two and a half inches in internal diameter and three feet long, fitted with flanges on both ends, are flanged onto the pipe E, and also onto the under side of the pipe G. This latter pipe is three inches in internal diameter, and is cast in sections, and put together with flanges, bolts, and nuts, like E.

All these pipes may be bricked into the front wall for about six inches. Into the upper horizontal pipe G are inserted twelve blast-pipes, H, on both sides of the kiln, having an internal diameter of one inch and a half, more or less. Holes should be cast in the pipe G to receive them, which may be tapped out to admit of screwing into them the said pipes. They are situated, respectively, over the middle of the furnace-doors. They look out from the front wall, and then down, by means of an elbow, to another elbow, which looks into each furnace, through a hole, two inches square, left in the wall directly over the frames of the respective furnace-doors. These blast-nozzles are shown at I. They are from ten to thirty-six times larger than the corresponding nozzles for jets of steam. Steam-jets cannot be over one-fourth of an inch in diameter without cooling the furnaces too much. But a very large volume of air, at a moderate pressure, is required to fill the long and large arches, produce complete combustion of the fuel, and push the incandescent gases from the furnace-doors into and up through all the interstitial spaces of the kiln.

The respective blast-pipes H are provided with valves K, for letting on, shutting off, and regulating the air-blast.

Pipes about one inch in diameter, more or less, and two inches long, more or less, may be inserted into the respective pipes E and A, and look into each ash-pit immediately under the grate-bars, for the purpose of injecting a blast of air to balance the downward pressure of the blast over the said bars, and prevent the heat from gushing out from the ash-pit doors, and also to improve the combustion of the fuel, and force the gases up into the kiln.

For the same purpose the under side of the grate-bars D may be perforated.

The kiln-walls L, with cartways M, are built in the ordinary manner of brick-kilns in common use. The kiln is set with raw bricks, three on three, and with arches turned over the respective furnaces in the precise manner of setting an old-fashioned brick-kiln, with the two exceptions now to be stated. In the middle of the respective arches partitions N, composed of raw bricks, and two feet wide, are built up every time the kiln is set, to prevent the two opposite blasts from blowing against each other. This arrangement is shown in the transverse section presented in Fig. 3.

In the longitudinal vertical section exhibited in Fig. 2 a system of flues is shown extending from the arches through the interior of the bricks to the top of the kiln. These flues start from the tops of the arches, and are about two feet apart across the entire length of each arch. They are made with the raw brick every time the kiln is set. They extend upward from the arches in a perpendicular direction, O, for about eight courses of bricks. These are made by leaving out the middle brick of each bench of three on three; or, to state the method more accurately, when the first course of bricks is set above the arches, and at right angles to them, a brick is left out over each arch, so far apart that, when the next course is set crossing the first one, the length of three bricks shall just reach from one open space to the next one. This will leave a space just the width of the flue between the arches, which is to be filled by one tier of bricks standing on their edges. When the said flues extend upward for about eight courses, then horizontal channels P R, extending over the whole kiln, and crossing each other at right angles, and uniting all the perpendicular flues O in the form of a checker-board, are made, having the depth and width of one brick, including the usual spaces on each side of it. Then the next course of bricks is set so as to cover all these flues except another set of perpendicular ones, S, equal in number and size to O, and made in a similar manner, except that they are situated half-way between those shown at O, for the purpose of retaining and circulating the heat more perfectly. When these flues have risen about eight courses higher another set of horizontal flues, T U, is formed precisely like those shown by P R, and heretofore described. From these ascend to the top of the kiln, and open to the external air, another set of perpendicular flues, V, midway between those shown at S, and constructed precisely like them. On the top of the kiln as thus set I lay down three platting courses of hard-burned bricks, W X Y, as tightly as possible, breaking joints, but leaving all the mouths of the flues open.

The great advantage of this system of flues is that it enables me to lay down a very tight and thick cover over my kiln when it is cold, and the setters can do it properly without sealing up the abundant openings necessary to discharge the water-smoke when the kiln is first fired. This is not the case with an old-fashioned brick-kiln. In such a kiln, when the fires are first lighted the raw bricks are damp and cold, piled up thirty-eight or forty courses high, with small interstitial spaces between them, and no artificial draft. It is impracticable, therefore, to lay down any proper cover until the water-smoke has gone and the kiln becomes tolerably hot. At this stage of burning, the smoke, gases, and heat are so abundant, and oftentimes insufferable, that the men will not and cannot, with any degree of comfort, cover the kiln. The consequence is that, when the heat rises higher, and the kiln gets hotter, the bricks shrink, the openings between them become larger, the heat leaves the sides and top of the kiln salmon, and much fuel is wasted. My tight cover holds in the heat when the kiln becomes hot, and converts the top into an oven during the latter part of the time of burning, and yet the abundant openings through the nearly two hundred chimneys rising from my furnaces to the top of the kiln, and discharging their watery contents into the air from the very moment the kiln is fired, fulfill the two indispensable conditions of rapid, economical, and perfect brick drying and burning. During the first stage of drying and heating the kiln it is sufficiently open to throw out, by the powerful natural draft, the watery vapor into the air, and during the latter period of burning, by shutting up the mouths of the flues on the top of the kiln with bricks laid over them, the unobstructed white heat rising rapidly through the numerous flues, and, accumulating under the tight cover, creates a very speedy and uniform settling heat throughout the entire charge.

Another valuable benefit results from this system of flues. If, by any reason, the kiln does not uniformly settle, and backs persistently stand up in consequence of an insufficiency of heat, by opening the flues at those points the heat is rapidly drawn thither in such intensity as to cause, in a very short time, the necessary settling. Fire-bricks, and fire-tiles, and lime, and other similar substances requiring great heat, can be burned in this kiln. Lime burned with its white-hot gases, free from ashes, is whiter and more valuable than when burned with mixed coal.

The mode of its operation in burning bricks is as follows: When the kiln is set, as hereinbefore described, the fires are kindled in the fire-places under the arches. The pans in the ash-pits are filled two-thirds full of water. The engine is started, and the blower forces the air into the receiving-pipe A, and from thence into all the hollow grate-bars D, and into the two front pipes E, and through the upright pipes F into the two pipes G, and into the branch pipes H. By opening the cocks K forcible jets of air are delivered into the respective fire-places, over the burning fuel and under the arches of the kiln. The result is that the fires begin to burn briskly, a partial vacuum is made in the front ends of the furnaces, the air is drawn up through the grate-bars, and the combustion of the fuel and smoke is highly accelerated. As the hollow grate-bars become hot, the air, passing through them, is elevated in temperature, and aids in raising the heat of the fires. Similar forcible jets of air may be discharged into the respective ash-pits under the grate-bars, for the purpose of balancing the downward pressure of the heated gases caused by the forcible air-blasts discharged above the grate-bars and over the burning fuel. These jets, discharged under the grate-bars, perform offices similar to those performed by the jets discharged above them. I usually leave the doors of the kiln wide open at the commencement of the firing. The forcible blasts of air from the nozzles cause large volumes of air to rush into the furnaces, and become elevated in temperature, and ascend up through the mass of bricks. Very soon the bricks, becoming warm, begin to discharge their moisture through the open flues into the air. By keeping the doors open for some hours, I prevent the lower part of the kiln from becoming too hot, and cause the necessary heat to rise into its upper part to throw off the water-smoke. As this begins to decline I gradually shut the doors. During this stage my kiln is a most effective drier of bricks. Warm air passing abundantly through it and drawn up by natural suction through the flues, and forced up, also, by the driving-power of the blasts, effects the very rapid drying of the charge. The bricks may, therefore, be set in my kiln when only dry enough to bear their weight. From most power-presses they may be set directly. The setting of one day's working will be dry enough by the next day to bear the weight of additional courses. The air may be blown through a kiln in the course of setting without any fires in the furnaces, and cause the rapid drying of the bricks. In from fifteen to twenty hours after the fires are kindled the water-smoke is all gone, and the bricks begin to get hot.

I now commence to close up the flues on the top of the kiln by shoving bricks partly over their mouths. I also close the doors by degrees. At this stage I look through the peep-holes, through which the nozzles are discharging blasts of air, and view the arches. If they exhibit too red a heat I open the doors a little, but only enough to keep the heat from rising too high, yet not enough to let it be lowered too much. By operating in this way I send up the heat into the middle and top of the kiln. I keep closing up the draft-holes on the top of the kiln as fast as I can do so without sealing up the kiln too tightly. The heat will now rise rapidly through all parts of the kiln. The air-blasts are now very hot, by reason of the heated grate-bars, and the forcible jets of this heated air produce intense combustion, and drive the hot gases through all the honeycomb of the charge. The numerous flues allow them to rise immediately to the upper portions of the kiln, and the very tight platting on its top, together with the covers on the mouths of the flues, prevent the escape of the heat into the air, cause it to accumulate in the top of the charge, and the whole kiln to become a uniformly-heated oven, and cause the whole kiln to become red hot. This usually takes place, if the firing is rightly managed, in twenty-five hours from the time of lighting the fires.

I now close up very tightly all the mouths of the flues on the top of the kiln. The crevices through the joints of the three platting courses will, under the great force of the blast-jets, allow a sufficient escape of gases to permit the combustion of the fuel to go on, and the resulting heat to be circulated through the entire mass of bricks. Up to this point I endeavor to raise the kiln gradually and uniformly to a high red heat, without letting the arches get much hotter than the parts above them. I do this by opening the doors a little while, from time to time, after having gradually closed them during the first half day of burning.

The heat from the fuel and the hot arches above it will now be deflected down into the ash-pits so abundantly, by reason of the pressure of the heat in the kiln, that the water in the pans in the ash-pits will boil rapidly, and protect the grate-bars, and prevent the formation of clinkers, and temper the heat of the arches.

The numerous flues communicating with the arches allow the heat created by the intense fury of the fires, by rising through them, to get away from the bottom of the kiln and reach at once the upper courses of the bricks, while the pressure of heat in the kiln, by means of the heavy blast-jets, forces the heated products of combustion to the very walls, and through every crevice of the charge. But this red heat will only produce a kiln of salmon bricks.

A high white heat is necessary to semi-fuse the molecules of the clay, and cause them to unite together and shut up the interstitial spaces between them. This is the reason why such bricks shrink and become a solid non-porous and homogeneous body, and the kiln settles. Boldness, guided by intelligence and experience, is now necessary. Such a heat must now be raised in all parts of the kiln. It is not difficult to do it. With my powerful hot-air blasts and tight cover I can puddle the whole mass of bricks, and run them into lava. So it is necessary to proceed with caution and vigilance. At this stage the arches will very suddenly become white hot. The eye of the burner must look through the peep-holes into all the arches every little while, and note their condition. A clean, thin fire will yield the best heat. I keep the water-pans two-thirds full of water, and run in the long-handled hoe occasionally and hoe out the ashes. I look sharp and often at the top of the kiln, and shove up the platting, and keep familiar with the rising dryness of heat. When the arches become dazzling white, I open the doors and let in the air. This will lower their temperature, and lift up the heat into the top. I only keep the doors open long enough to bring the heat down from a dazzling white to a low white, and never so low as a full red. I then shut the doors, and raise the heat again to a dazzling white, and then open the doors as before. By proceeding in this way for about twelve hours, every brick in the kiln will be white hot. This condition can be reached in about forty hours after lighting the fires. In fifteen or twenty hours more the kiln should be settled sufficiently to have every brick in it hard and sonorous.

The functions which the air-blasts produce in my kiln are several and very important, besides their ordinary uses in promoting combustion. In the first place they aid very greatly in drying a kiln of bricks preparatory to heating them red and white hot, as hereinbefore explained. In the second place they force a passage through the mass of damp and cold bricks, having no natural draft, and cause the heat to follow at the very start. Thirdly, when the doors of the furnaces are thrown open to cool the arches, they drive into the said arches, and up through them, large volumes of air, to do in a few minutes what it would take a much longer period to accomplish without them. Fourthly, they force the hot products of combustion from the furnaces into all the interstitial spaces of the charge up to the very top and out to the sides, in such a uniform manner as to shorten the time of burning, lessen the expense for fuel, and improve the quality and value of the bricks. As a co-efficient power for perfectly drying and uniformly burning a kiln of bricks hard in the shortest possible time, they cannot be over-estimated.

I have described a particular system of flues through my kiln, which I consider the best, but it is evident that many other forms or directions of flues may be made. I do not, therefore, limit my invention to the system which I have described. But any form of flues, or direction of the same leading from or near the base of the kiln, or arches of the same, through the superincumbent mass of bricks, or tiles, or other enumerated substances composing the charge to the top of the kiln, I claim as my invention.

I have also described a system of hollow pipes for compressing, conducting, heating, and discharging blasts of hot air into the furnaces of my kiln, which I consider the best. But it is evident that either cold or heated air may be forced into the horizontal pipes G, on each of the opposite sides of the kiln, and through the respective branch pipes H, into the furnaces. This method of supplying forcible jets of air, either hot or cold, to the said furnaces, for the purposes hereinbefore described, I consider to be an integral part of my invention.

Having thus described the nature and operation of my invention, what I desire to secure by Letters Patent is—

1. The combination and arrangement of the central pipe A, the hollow grate-bars D, the respective pipes E, the upright pipes F, the pipes G, the branch pipes H, and the blast-nozzles I, with the furnaces of a kiln, substantially in the manner and for the purposes hereinbefore set forth.

2. The arrangement of the furnaces of a kiln with jets of air discharging over the furnace-doors directly into the arches of the kiln, and parallel therewith, substantially in the manner and for the purposes set forth.

3. The combination of the central air-pipe A with the respective ash-pits of a kiln, through the various branch pipes and perforated grate-bars, substantially in the manner and for the purposes hereinbefore described.

4. The perpendicular flues O, the horizontal flues P R, the perpendicular flues S, the horizontal flues T U, and the perpendicular flues V, constructed and arranged, in a kiln of bricks, tiles, and other similar substances, substantially in the manner and for the purposes shown and described.

5. The construction of flues through a kiln of bricks, tiles, lime, and other similar materials, extending from the heating-chambers or from the bottom or near the bottom of the kiln to the top of the same, and opening to the external air, for the purposes hereinbefore described.

6. The cover W X Y, composed of bricks or tiles, in combination with the flues, all constructed and arranged substantially in the manner and for the purposes set forth and described.

HENRY W. ADAMS.

Witnesses:
ISAAC R. OAKFORD,
J. Q. A. ZIEGLER.